Dec. 17, 1968  T. K. HUTCHINSON  3,416,592
MOLD PRESS AND CARRIAGE
Filed June 9, 1966  3 Sheets-Sheet 1
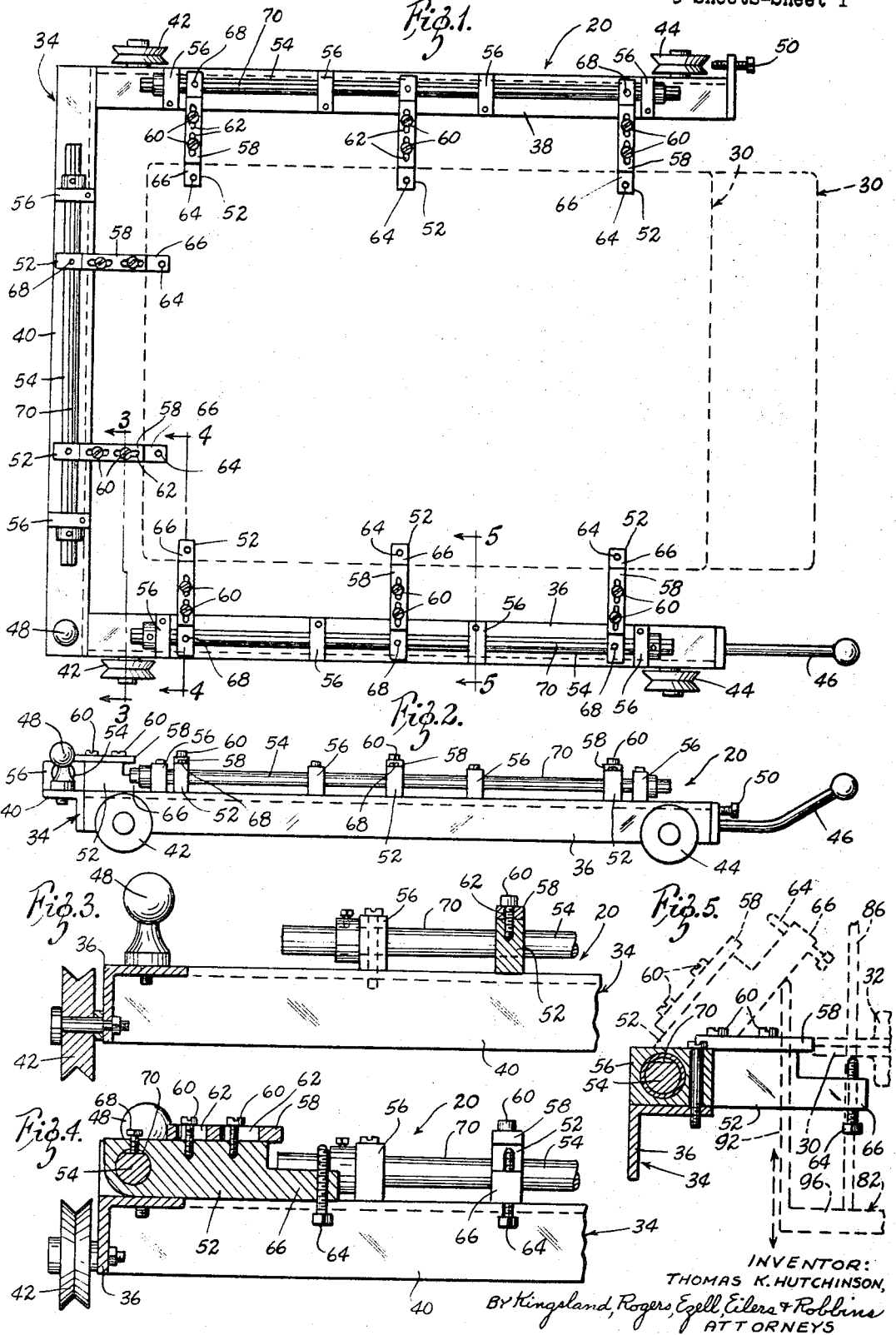
INVENTOR:
THOMAS K. HUTCHINSON,
BY Kingsland, Rogers, Ezell, Eilers & Robbins
ATTORNEYS Dec. 17, 1968  T. K. HUTCHINSON  3,416,592
MOLD PRESS AND CARRIAGE
Filed June 9, 1966  3 Sheets-Sheet 2
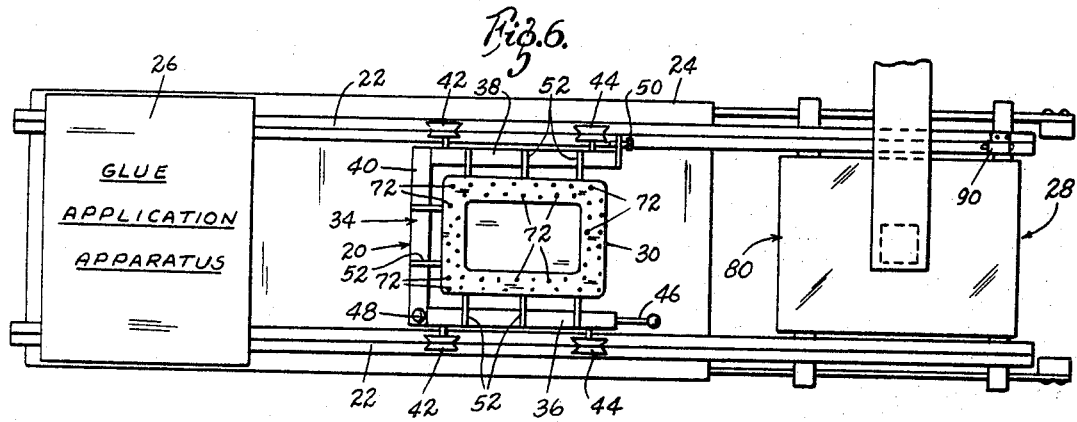
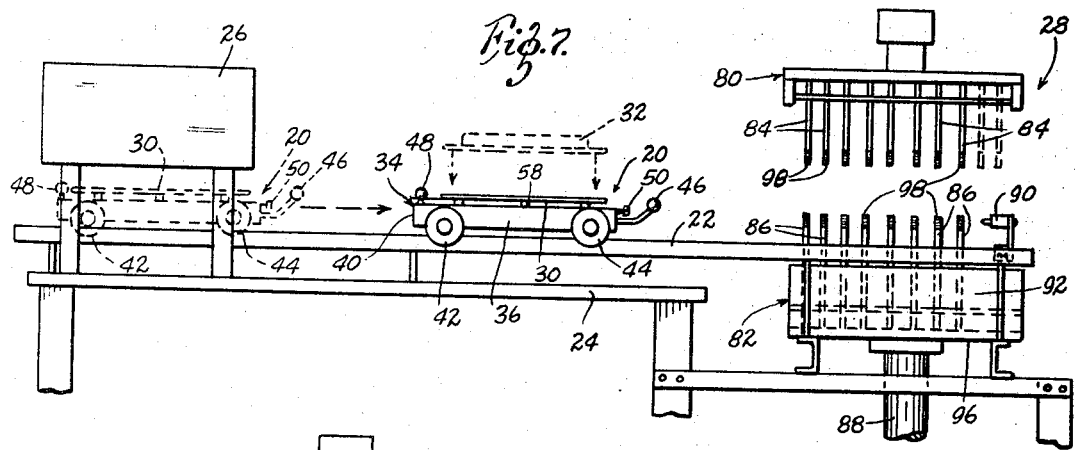
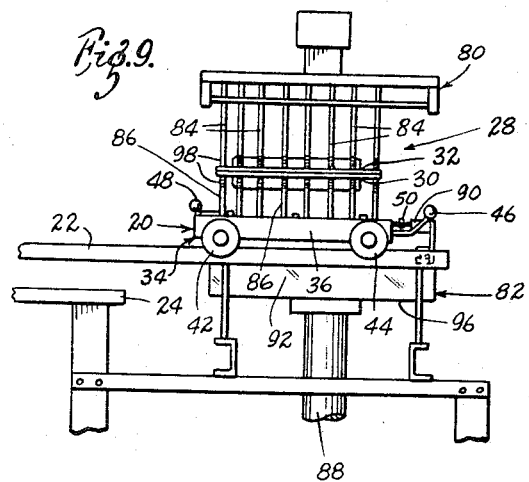
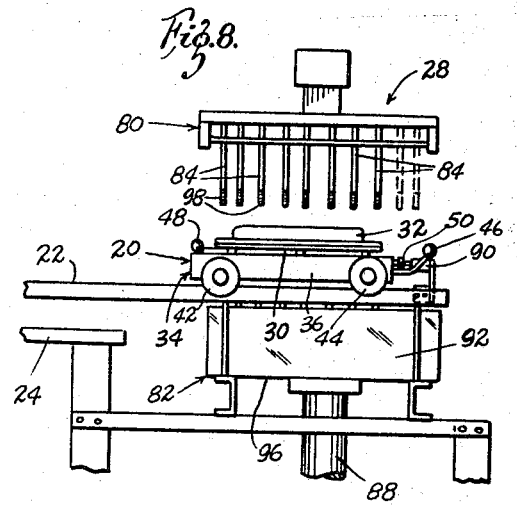
INVENTOR:
THOMAS K. HUTCHINSON,
BY Kingsland, Rogers, Ezell, Eilers & Robbins
ATTORNEYS

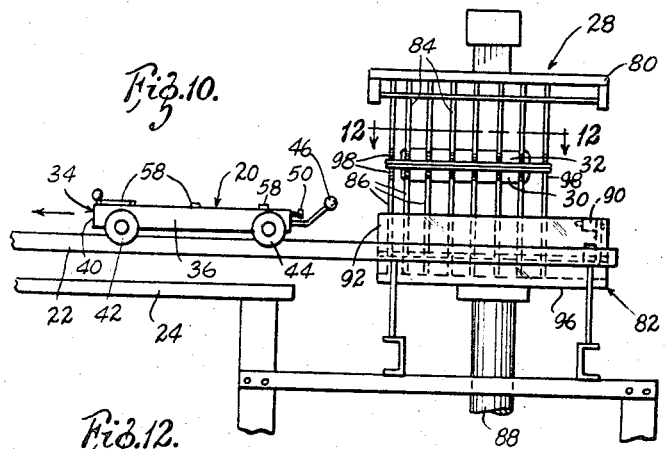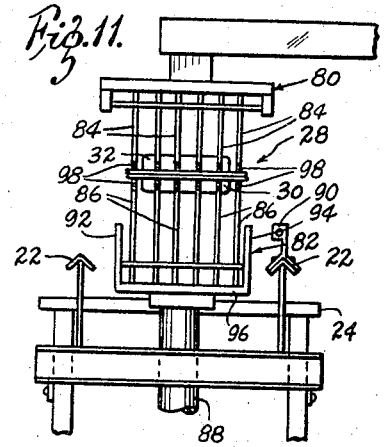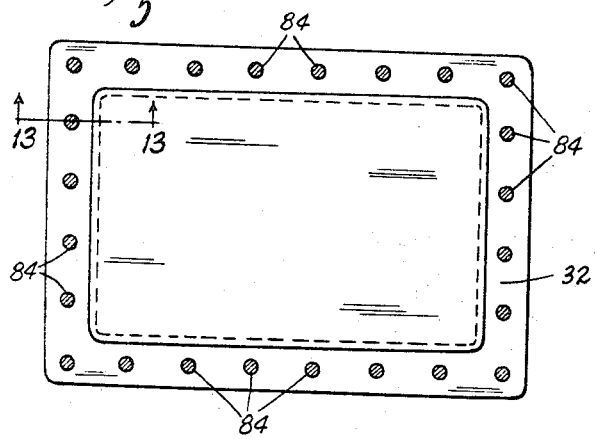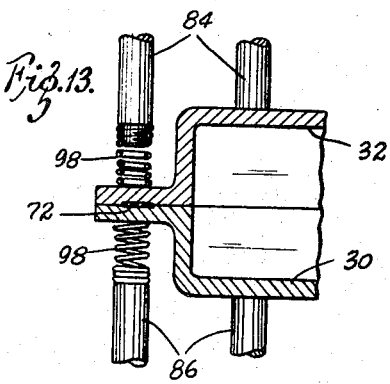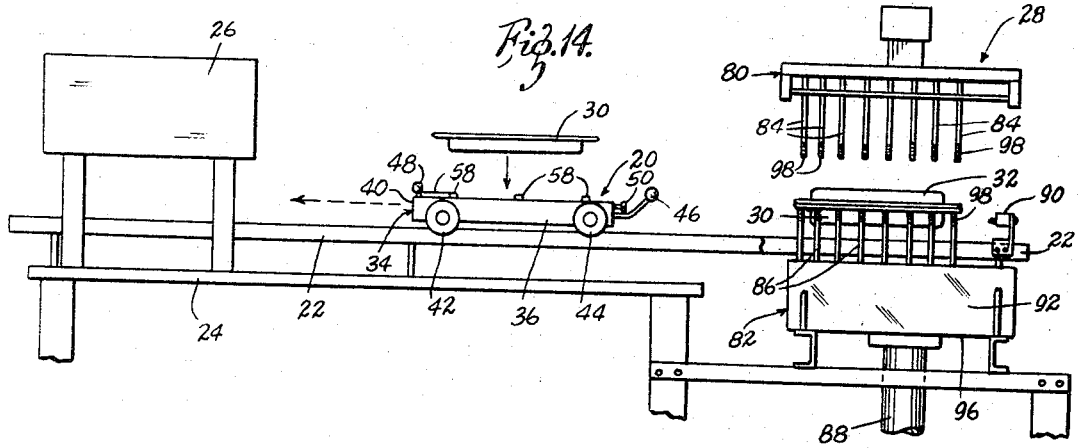

United States Patent Office 3,416,592
Patented Dec. 17, 1968

3,416,592
MOLD PRESS AND CARRIAGE
Thomas K. Hutchinson, 4649 Levis Lane,
Godfrey, Ill. 62035
Filed June 9, 1966, Ser. No. 556,481
18 Claims. (Cl. 164—210)

ABSTRACT OF THE DISCLOSURE

A mold transfer system utilizing a mold press and a U-shaped carriage movable between the jaws of the mold press when open. The carriage is provided with wheels for moving it from a work surface into the jaws of the mold press with finger support means for supporting the mold in the opening of the U-shaped frame of the carriage. The mold press is provided with mold engaging means for both the top and the bottom jaw portions for engaging the mold and lifting it from the carriage into the mold clamping position.

SUMMARY OF THE INVENTION

In the manufacture of shell molds, such as those shown in my prior Patent No. 2,804,661, granted Sept. 3, 1957, the two halves of a shell mold, namely the bottom or drag half and the top or cope half, are adapted to be glued together and then pressed for a predetermined period of time after which they are ready for the pouring of metal. The drag half of the mold in this operation is first applied with droplets of glue, after which the cope half of the mold is placed over the drag and then the two halves are positioned in a mold press where pressure is applied to bond the two halves together.

A principal feature of this invention provides means for handling the several necessary steps in the bonding operation for the shell halves in a very efficient manner. In equipment heretofore employed, each step in the sequence of operations required the completion of the final pressing or clamping operation in the mold press before initiating work on the preparation of the next mold. Work would be required to be delayed until the glue in the mold properly set up or bonded in the press. This set up time was left to the discretion of the operator and considerable variance and disadvantages and human error resulted. By means of this invention the time delay in the press is avoided and the clamping time is accurately controlled by a timer.

Further, a specially designed U-shaped carriage to receive the mold is provided. In this carriage the drag half of the mold may be fed underneath the gluing apparatus, and after this is completed then withdrawn to receive the cope half of the mold. After this has been accomplished, the carriage is moved upon its supporting rails into the mold press where its movement into registry in the press and in contact with a timer switch actuates automatic equipment, which raises the two halves of the mold off the carriage into clamping position. The carriage may then be withdrawn for the initiation of another cycle while the press is timed to maintain the clamping action for a predetermined period, after which the mold press is drawn apart or opened and the completed and bonded mold may be removed.

The above features are objects of this invention and further objects will appear in the detailed description which follows and will be otherwise apparent to those skilled in the art.

For the purpose of illustration of this invention, there is shown in the accompanying drawings a preferred embodiment. It is to be understood that these drawings are for the purpose of example only, however, and that the invention is not limited thereto.

In the drawings:

FIGURE 1 is a top plan view of the carriage with a pattern mold shown in varied size in dotted lines;

FIGURE 2 is a view in side elevation of the carriage;

FIGURE 3 is an enlarged view in section taken on the line 3—3 of FIGURE 1;

FIGURE 4 is an enlarged view in section taken on the line 4—4 of FIGURE 1; showing the construction of the pattern mold support fingers;

FIGURE 5 is an enlarged view in section taken on the line 5—5 of FIGURE 1 showing the mold support finger in two stages of operation, i.e., mold supporting relation and a clearing position shown in dotted lines;

FIGURE 6 is a top plan view showing the mold carriage positioned between the gluing apparatus and the press apparatus after a gluing stage and before the top half of the mold has been placed upon the bottom half;

FIGURE 7 is a view in front elevation otherwise similar to FIGURE 6 and showing the top half of the mold in the process of being placed upon the bottom half of the mold;

FIGURE 8 is a view in front elevation of the carriage as it is wheeled into position between the jaws of the press;

FIGURE 9 is a view taken similarly to FIGURE 8 but showing the press after it has been operated to lift the mold away from the carriage;

FIGURE 10 is a view taken similarly to FIGURE 8 but in still a later stage of operation after the carriage has been moved away from the mold press;

FIGURE 11 is a view in side elevation of the mold press taken from the right side thereof;

FIGURE 12 is an enlarged view in section taken on the line 12—12 of FIGURE 10 showing the positioning of the mold press clamp rods along the periphery of the mold;

FIGURE 13 is an enlarged view in section taken on the line 13—13 of FIGURE 12 showing the positioning of the mold press clamp rods on the flanges of the two halves of the mold; and FIGURE 14 is a view in front elevation showing the carriage after it is moved away from the mold press in a position to receive the bottom half of a mold preparatory to being moved into the gluing apparatus for a new cycle of operation.

Referring now to the drawings and FIGURES 6 through 11 in particular, the carriage of this invention is shown generally indicated by the reference numeral 20 riding upon a pair of rails 22. The rails are supported upon a work table 24 and lead from the glue application apparatus 26 at one side of the table to the mold press 28 at the other side of the table. The carriage is shown in FIGURE 6 with the drag half of the mold 30, while the cope half of the mold is shown in the process of being added in FIGURE 7, and is indicated by the reference numeral 32.

The structure of the carriage 20 is best shown in FIGURES 1 through 5. It is comprised of a generally U-shaped frame 34 having front and back members 36 and 38 connected by a side member 40. A pair of wheels 42 are individually supported on the left side of the frame, while another pair of wheels 44 are similarly supported upon the right side. A handle 46 provides for manual operation by the operator. Another handle 48, situated at the left side of the frame, insures that the carriage can be operated from either end. A contact member 50 is provided at the right side of the rear member 38, and is adapted to contact a limit switch 90 in the mold press to start the automatic operation of the press, as will be further described hereinbelow.

The carriage frame is provided with a plurality of pivotable mold supporting fingers 52 provided on the front, rear and side members of the carriage frame. Referring particularly to the lift fingers on the front member 36, it will be seen that these are journalled upon a shaft 54, which is supported and journalled on the frame by journal blocks 56. The individual fingers 52 are provided with an adjustment plate 58, which is adapted to be adjusted by screws 60 fitting in slots 62 provided in the adjustment plate. These plates provide for proper registry with the flanges of the drag and cope of the mold when placed upon the fingers. Likewise, an adjustment screw 64 is provided upon a tongue portion 66 of the finger members to bear against the under side of the shell mold flanges. The individual fingers can be adjusted from any desired position on the shaft 54 by means of adjustment screws 68, which bear against a flat portion 70 of the shaft 54. The finger members on the rear member 38 and the side member 40 are identical in construction and similar reference numerals will be employed.

The glue application apparatus 26 may be of conventional design. It provides for the dispensing of glue droplets, designated by the reference numeral 72 in FIGURE 6. The glue droplets are dispensed in a selected pattern so that the two halves of the mold may be properly bonded and sealed together.

The mold press is best shown in FIGURES 7 through 14. It employs a basic clamp design using a stationary upper jaw portion 80 and a movable bottom jaw portion 82. A plurality of vertical clamp rods 84 are provided in the top jaw portion and it will be understood that the positioning of these may be changed so as to insure that they are in registry with the flanges of the mold or bear against any desired portion of the mold, as is conventional in this art. Likewise, the bottom jaw portion 82 is provided with vertical clamp rods 86, which are in general registry with the clamp rods of the upper jaw portion and may similarly be changed in positioning as desired.

The bottom jaw portion is supported upon a pneumatic ram 88 and it will be understood that it is connected to a conventional pneumatic cylinder to effect the raising and lowering of the bottom jaw portion. The raising and lowering is controlled by switch 90, which is positioned upon the right end of the rear carriage rail, and is adapted to be contacted by the contact member 50 supported upon the carriage. The switch 90 is connected to an automatic timer (not shown) which controls the air cylinder to provide for the raising of the lower jaw portion and holding it in position for a selected period of time, and then upon the completion of the time cycle, lowering the jaw portion until the switch 90 is contacted again in another cycle of operation.

The lower jaw portion is further provided with a pair of cam members 92 and 94, which rides upwardly from the base of the jaw member designated by the reference numeral 96. These cam members are adapted to contact the fingers after the individual press clamp rods 86 lift the mold away from the fingers. The cam members 92 and 94, accordingly, will raise the fingers to the position shown in FIGURE 5 so that the carriage may be withdrawn from the mold press without the fingers engaging the contact or press rods 84 and 86. Thus, this operation effects a clearance or clearing of the fingers away from the rods.

OPERATION

The commencement of the operation of this equipment is best shown in FIGURE 14. In this position a drag portion of a shell mold is placed upon the carriage. The carriage is then moved in the position of the arrow undernearth the gluing apparatus 26. The conventional gluing apparatus then dispenses droplets of glue 72 upon the drag portion 30 of the mold, which is withdrawn to the position shown in FIGURE 6.

After this operation has been effected, a cope portion 32 of the mold is placed in registry upon the drag portion of the mold. The carriage 20 is then moved between the upper and lower jaw portions of the mold press as shown in FIGURE 8. When the carriage is moved to its limiting position at the right hand portion of the rails 22, the contact member 50 of the carriage will engage the switch 90 and cause the raising of the bottom portion of the press. The bottom portion is raised to the position shown in FIGURE 9, and in so doing the clamp rods 86 will engage the flanges of the shell mold and lift it into a clamping position. The spring arrangements 98 at the tips of the rods prevent any damage to the mold and provide a proper degree of cushioning with, at the same time, a firm application of pressure. FIGURE 13 shows the engagement of the clamp rods with the flanges of the cope and drag portions of the mold. The droplets of glue 72, after firm engagement in the clamping operation, provide a bond firmly holding the portions of the shell mold together.

In the raising operation of the lower press jaw to move the mold away from the carriage, as shown in FIGURES 9 and 10, the mold supporting fingers 52 are moved upwardly by the cam plates 92 and 94. This is particularly shown in FIGURE 5. When this operation has been effected, the fingers will clear the support rods and the carriage can be withdrawn, as shown in FIGURE 10, from the mold press. A new operation may then be effected to start the next cycle, as shown in FIGURE 14. At the completion of the mold pressing cycle the bottom jaw portion of the mold, through the action of a timer, is retracted, and the bonded mold halves can be removed as a bonded unit to storage.

Various changes and modifications may be made within this invention as will be readily apparent to those skilled in the art. Such changes and modifications are within the scope and teaching of the invention as defined by the claims appended hereto.

What is claimed is:

1. A mold transfer system comprising a mold press, a carriage adapted to be moved between the jaws of the mold press in the open position, said carriage comprising a horizontally positioned U-shaped frame, wheel means for moving the carriage on a horizontal work surface, said means being supported from the frame of the carriage, and support means on said frame for supporting a shell mold thereon in the opening defined by the U-shaped frame, said press being provided with a top jaw portion having top surface mold engaging means and a bottom jaw portion having bottom surface mold engaging means, and means for raising the bottom jaw portion to engage the mold and lift it from the carriage into a mold clamping position.

2. The carriage of claim 1 in which the mold support means comprises a plurality of support fingers extending inwardly from the frame.

3. The carriage of claim 1 in which the mold support means comprises a plurality of support fingers extending inwardly from the frame and having adjustable means to support the bottom of the mold.

4. The carriage of claim 1 in which the mold support means comprises a plurality of support fingers extending inwardly from the frame and having adjustable means to engage the edges of the mold to position it in a selected position on the carriage.

5. The carriage of claim 1 in which the mold support means comprises a plurality of support fingers extending inwardly from the frame and having adjustable means to engage the edges of the mold to position it in a selected position on the carriage and having adjustable means to support the bottom of the mold.

6. The carriage of claim 1 in which the mold support means comprises a plurality of support fingers extending inwardly from the frame, said support fingers being rotatable from a horizontal position to a raised position to clear obstructions when used in a mold press after the mold is removed from the carriage.

7. The carriage of claim 1 in which the mold support means comprises a plurality of support fingers extending inwardly from the frame, said fingers being adjustably supported on a rod means journalled for pivotal movement on the carriage frame.

8. The carriage of claim 1 in which the mold support means comprises a plurality of support fingers extending inwardly from the frame, said fingers being adjustably supported on a rod means journalled for pivotal movement on the carriage frame, and said support fingers being provided with adjustable means to engage the edges of the mold to position it in a selected position on the carriage and having adjustable means to support the bottom of the mold.

9. The mold transfer system of claim 1 in which the press is provided with a top jaw portion having mold engaging clamp rods and a bottom jaw portion provided with clamp rods adapted to engage the bottom of the mold, and means for raising the bottom jaw portion to engage the mold by the clamp rods and lift it from the carriage into a mold clamping position.

10. The mold transfer system of claim 1 in which the press is provided with a top jaw portion having mold engaging clamp rods and a bottom jaw portion provided with clamp rods adapted to engage the bottom of the mold, and means for raising the bottom jaw portion to engage the mold by the clamp rods and lift it from the carriage into a mold clamping position, said means comprising a limit switch adapted to be contacted by the carriage when it is moved into registry between the jaws of the mold press.

11. The mold transfer system of claim 1 in which the press is provided with a top jaw portion having mold engaging clamp rods and a bottom jaw portion provided with clamp rods adapted to engage the bottom of the mold, and means for raising the bottom jaw portion to engage the mold by the clamp rods and lift it from the carriage into a mold clamping position, and timer means for holding the jaws of the mold press together for a selected period of time.

12. The mold transfer system of claim 10 in which the carriage is provided with wheels, and rail means are provided extending into the jaws of the press to provide guide means for the carriage to insure proper registry of the mold in the press.

13. The mold transfer system of claim 1, said carriage comprising a U-shaped frame, wheel means for moving the carriage on a work surface, said means being supported from the frame of the carriage, and support means on said frame for supporting a shell mold thereon.

14. The mold transfer system of claim 1, said carriage comprising a U-shaped frame, wheel means for moving the carriage on a work surface, said means being supported from the frame of the carriage, and support means on said frame for supporting a shell mold thereon, said mold support means comprising a plurality of support fingers extending inwardly from the frame.

15. The mold transfer system of claim 1, said carriage comprising a U-shaped frame, wheel means for moving the carriage on a work surface, said means being supported from the frame of the carriage, and support means on said frame for supporting a shell mold thereon, said carriage being positioned to first feed the open end of the U-shaped frame into the jaws of the mold press.

16. The mold transfer system of claim 9 in which said carriage comprises a U-shaped frame, wheel means for moving the carriage on a work surface, said means being supported from the frame of the carriage, and support means on said frame for supporting a shell mold thereon, said carriage being positioned to first feed the open end of the U-shaped frame into the jaws of the mold press, said mold support means comprising a plurality of support fingers extending inwardly from the frame.

17. The mold transfer system of claim 9 in which said carriage comprises a U-shaped frame, wheel means for moving the carriage on a work surface, said means being supported from the frame of the carriage, and support means on said frame for supporting a shell mold thereon, said carriage being positioned to first feed the open end of the U-shaped frame into the jaws of the mold press, said mold support means comprising a plurality of support fingers extending inwardly from the frame, and said bottom jaw of the press being provided with cam means adapted to contact the support fingers and move them to a mold press clearing position for ready withdrawal of the carriage after the mold is removed therefrom.

18. The mold transfer system of claim 9 in which said carriage comprises a U-shaped frame, wheel means for moving the carriage on a work surface, said means being supported from the frame of the carriage, and support means on said frame for supporting a shell mold thereon, said carriage being positioned to first feed the open end of the U-shaped frame into the jaws of the mold press, said mold support means comprising a plurality of support fingers extending inwardly from the frame, said support fingers being rotatable from a horizontal position to a raised position to clear obstructions when used in a mold press after the mold is removed from the carriage, and said bottom jaw of the press being provided with cam means adapted to contact the support fingers and move them to a mold press clearing position.

References Cited

UNITED STATES PATENTS

| | | | |
|---|---|---|---|
| 2,724,878 | 11/1955 | Valyi | 164—165 X |
| 2,845,669 | 8/1958 | Hackett et al. | 164—165 X |
| 2,850,775 | 9/1958 | Northington et al. | 164—168 X |
| 2,893,078 | 7/1959 | Jahn et al. | 164—165 X |
| 3,207,065 | 9/1965 | Danly | 100—229 |

FOREIGN PATENTS 996,981 6/1965 Great Britain.

J. SPENCER OVERHOLSER, *Primary Examiner.*

E. MAR, *Assistant Examiner.*

U.S. Cl. X.R.

164—166, 219; 100—215